(12) United States Patent
Ichikawa et al.

(10) Patent No.: US 8,565,631 B2
(45) Date of Patent: Oct. 22, 2013

(54) IMAGE FORMING APPARATUS, IMAGE FORMING SYSTEM, FIXING CONTROL METHOD, AND COMPUTER PROGRAM PRODUCT

(75) Inventors: Mikiya Ichikawa, Tokyo (JP); Kaname Nomura, Tokyo (JP); Yoshio Taga, Tokyo (JP); Tomoaki Okamura, Tokyo (JP); Junji Suzuki, Tokyo (JP); Kazuki Sasayama, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 317 days.

(21) Appl. No.: 12/929,691

(22) Filed: Feb. 9, 2011

(65) Prior Publication Data

US 2011/0217061 A1    Sep. 8, 2011

(30) Foreign Application Priority Data

Mar. 8, 2010    (JP) .................. 2010-050476

(51) Int. Cl.
*G03G 15/20*    (2006.01)
(52) U.S. Cl.
USPC .......................................................... 399/69
(58) Field of Classification Search
USPC ....................................................... 399/67, 69
See application file for complete search history.

(56) References Cited

U.S. PATENT DOCUMENTS

2009/0208235 A1* 8/2009 Yoon ............................. 399/67

FOREIGN PATENT DOCUMENTS

| JP | 06019257 A | 1/1994 |
|---|---|---|
| JP | 2006126396 A | 5/2006 |
| JP | 2007290132 A | 11/2007 |
| JP | 2009151102 A | 7/2009 |
| JP | 2010274435 A | 12/2010 |

OTHER PUBLICATIONS

Translation of Takeshi (JP 09197893 A, pub date Jul. 31, 1997).*
English Abstract of JP 2010-274435, published Dec. 9, 2010.

* cited by examiner

*Primary Examiner* — Walter L Lindsay, Jr.
*Assistant Examiner* — Frederick Wenderoth
(74) *Attorney, Agent, or Firm* — Harness, Dickey & Pierce, P.L.C.

(57) ABSTRACT

An image forming apparatus includes: a PDL analyzing unit that analyzes print data and obtains a drawing condition; a drawing unit that uses a type of dither selected from types of dither, prepared and associated with drawing conditions, according to the drawing condition analyzed, and generates output image data; an image forming unit; a fixing unit that fixes an image formed on a recording sheet by heating the image to a fixing temperature; a fixing control unit that controls the fixing temperature to a target value; and a database in which each of the types of dither is associated with the target value of fixing temperature for power saving. The fixing control unit obtains from the database the target value of fixing temperature corresponding to the type of dither used in the drawing unit and carries out control to conduct fixing at the target value thus obtained.

9 Claims, 4 Drawing Sheets

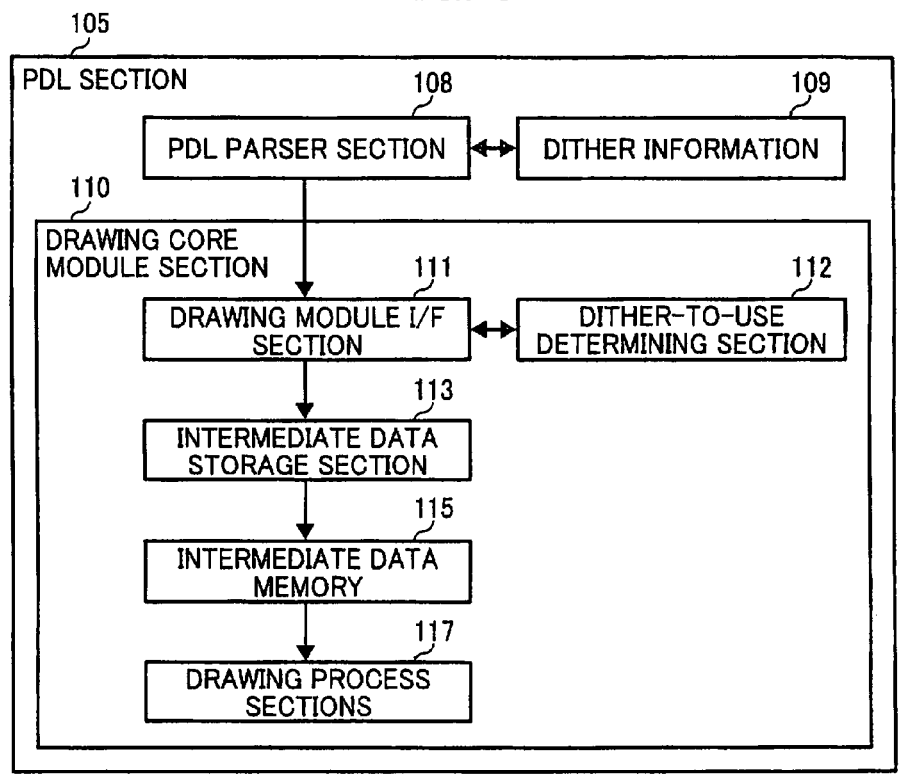

FIG. 5

| DITHER ID | PLANE | DENSITY VALUE | FIXING TEMPERATURE INFORMATION |
|---|---|---|---|
| NUMBER 0 | K | 255 | LV2 |
| | | OTHER THAN 255 | LV1 |
| | C | 255 | LV2 |
| | | OTHER THAN 255 | LV1 |
| | | ... | ... |
| NUMBER 1 | K | 255 | NORMAL |
| | | ... | ... |

FIG. 6

| PRIORITY | HIGH | MEDIUM | LOW |
|---|---|---|---|
| FIXING TEMPERATURE INFORMATION | NORMAL | LV1 | LV2 |

IMAGE FORMING APPARATUS, IMAGE FORMING SYSTEM, FIXING CONTROL METHOD, AND COMPUTER PROGRAM PRODUCT

CROSS-REFERENCE TO RELATED APPLICATIONS

The present application claims priority to and incorporates by reference the entire contents of Japanese Patent Application No. 2010-050476 filed in Japan on Mar. 8, 2010.

BACKGROUND OF THE INVENTION

1. Field of the Invention

The present invention relates to an image forming apparatus such as a printer and an MFP that forms an image on a recording sheet based on print data sent from a host and, more particularly, to an image forming apparatus, image forming system, a fixing control method for carrying out the control of reducing the power consumed for heat-fixing an image formed on a recording sheet with toner to a bare minimum, and a computer program product for executing such control.

2. Description of the Related Art

In an image forming apparatus such as a printer and an MFP that forms an image on a recording sheet based on print data sent from a host, such as a personal computer (PC) with a printer driver installed, a so-called laser printer has been widely used as a printer engine. The laser printer scans and exposes with a laser beam, the lighting of which is controlled in response to image data drawn, to form an image in electrostatic photography. In the course of image forming in this electrostatic photography, the process of fixing, in which a toner image formed on a recording sheet is fixed onto the sheet, requires heating at a high temperature. The power consumed by a heater used for this is substantially large.

In recent years, a demand for reducing such power consumption to a minimum to achieve power saving with reference to a typical electricity consumption (TEC) value has been increasing.

Conventional technologies proposed for the purpose of reducing the power consumed in the fixing includes, for example, Japanese Patent Application Laid-open No. 2009-151102 and Japanese Patent Application Laid-open No. H6-19257. Japanese Patent Application Laid-open No. 2009-151102 discloses that, when a fixing temperature in power saving mode is set, a fixable amount of toner applied is changed corresponding to the fixing temperature. Japanese Patent Application Laid-open No. H6-19257 discloses that a low fixing temperature is set in response to the instruction of power saving mode to reduce the power consumption.

Meanwhile, in many of laser printers and MFPs provided with laser printers, a method to use dithering is adopted to draw an image in halftone. Fixing a toner image, which is transferred to a recording sheet using image data generated by dithering in a drawing process, onto the surface of the sheet requires a high temperature.

This is because, when the shape of the toner image to be fixed on the recording sheet is a small independent dot, there is a high possibility of the dot coming off after printing unless being fixed at a sufficiently high temperature. In contrast, when the shape of the toner image is a line sufficiently long or an area sufficiently wide, the toner image is less likely to come off even when a fixing temperature is relatively low and such fixing is proved to be of practical through experiences.

In such a conventional fixing process, however, there is no conception of varying the control of fixing temperature depending on the difference in type of dither used for drawing images (in terms of this, there is no description made in either of Japanese Patent Application Laid-open No. 2009-151102 and Japanese Patent Application Laid-open No. H6-19257). Thus, the fixing temperature is set to a high temperature adapting to the characteristics specific to small independent dots of the dithering, resulting in the toner image in the shapes of a sufficiently long line and a sufficiently wide area being heated at an unnecessarily high temperature.

SUMMARY OF THE INVENTION

It is an object of the present invention to at least partially solve the problems in the conventional technology.

According to an aspect of the present invention, there is provided an image forming apparatus including: a PDL analyzing unit that analyzes print data in a page description language and obtains a drawing condition including a drawing command set; a drawing unit that uses a type of dither, which is selected from a plurality of types of dither, which are prepared and associated with drawing conditions in advance, according to the drawing condition analyzed by the PDL analyzing unit, and generates output image data by conducting a drawing process in accordance with the drawing condition; an image forming unit that forms an image on a recording sheet using the output image data; a fixing unit that fixes the image formed on the recording sheet to the recording sheet by heating the image to a fixing temperature; a fixing control unit that controls the fixing temperature to a target value; and a database in which each of the types of dither is associated with the target value that is a target value of fixing temperature for power saving, wherein the fixing control unit obtains from the database the target value of fixing temperature corresponding to the type of dither used in the drawing unit and carries out control to conduct fixing at the target value thus obtained.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is a block diagram illustrating a detailed configuration of a PDL section indicated in the functional block diagram depicted in FIG. 2;

FIG. 4 is an exemplary table of dither and fixing temperature correspondence information prepared as a database;

FIG. 5 is an exemplary table of another dither and fixing temperature correspondence information prepared as the database;

FIG. 6 is an exemplary table of fixing temperature and priority correspondence information prepared in dither information.

DETAILED DESCRIPTION OF THE PREFERRED EMBODIMENTS

Figure 1:
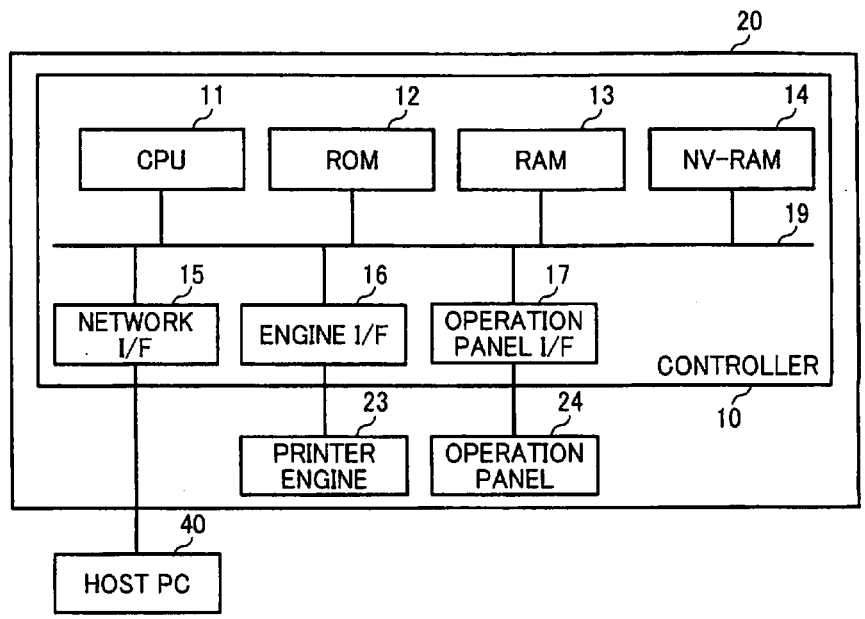
FIG. 1 is a schematic diagram illustrating the hardware configuration of a printer of an image forming apparatus according to an embodiment of the invention.

An exemplary embodiment of the present invention will be described with reference to accompanying drawings.

The following embodiment is an example in which an image forming apparatus according to the invention is applied to a laser printer, more specifically, a printer that forms an image in electrostatic photography by scanning and exposing with a laser beam the lighting of which is controlled in response to drawn image data for output. In the present embodiment, while the printer is intended to mean the one that can produce print output in color and in monochrome, it may be a printer that produces print output in monochrome only.

In the process of generating image data for print output (hereinafter, also simply referred to as "output image data") in a drawing process, it is assumed that the drawing process is carried out using a type of dither selected from a plurality of types of dither prepared in advance corresponding to drawing conditions indicated in print data in a page description language (PDL) (hereinafter, also referred to as "PDL data"). The drawing process is intended to mean the process of generating the output image data used in a printer engine from the PDL data.

As long as the foregoing assumption is satisfied, the image forming apparatus according to the invention can be applied to an image forming apparatus other than the laser printer that forms an image of high resolution in electrostatic photography.

Hardware Configuration Overview

FIG. 1 is a schematic diagram illustrating the hardware configuration of the printer according to the embodiment of the invention.

This printer 20 as an image forming apparatus depicted in FIG. 1 has a controller 10 that controls the whole printer, a printer engine 23 that prints (forms an image) on a recording sheet based on the output image data drawn, and an operation panel 24 that provides a function as a user interface provided with a display section and an operation section such as input keys.

The controller 10 has, as components, a central processing unit (CPU) 11 that executes commands of a software program, a read only memory (ROM) 12 that stores therein a control program, control data, and the like used by the CPU 11 for the operation of the controller, a random access memory (RAM) 13 used as a page (frame) memory temporarily storing therein the drawn output image data generated by the control program and the like or as a work memory storing therein data required for the operation of the software program, and a non-volatile RAM (NV-RAM) 14 that is a non-volatile memory storing therein setting data such as printing conditions and the like that depends on a device. In other words, a computer having the respective components of the CPU 11, the ROM 12, and the RAM 13 is made to function as the controller 10.

The controller 10 further has, as components, an engine interface (I/F) 16 for exchanging data with the printer engine 23, an operation panel I/F 17 for exchanging data with the operation panel 24, and a network I/F 15 for exchanging data with a PC 40 that is a host connected on a network and is installed with a printer driver (hereinafter, referred to as a "host PC"). A system that includes the host PC 40 connected with the network I/F 15 by a communication unit (not depicted) and the printer 20 as the image forming apparatus is referred to as an image forming system.

The respective components forming the controller 10 are connected with one another via an internal bus 19.

The controller 10, based on print data in PDL received from the host PC 40, carries out a drawing process including various conversion processes, generates image data used for print output, and makes the printer engine 23 output the data. The RAM 13 stores therein the print data from the host PC 40, image data in an intermediate data format generated from the print data, pixel data in raster format, and the image data used for print output that is to be generated in the process at a subsequent stage.

The printer 20 reads the control program and setting information relating to the operating conditions of controls and processes stored in storage devices such as the ROM 12 and the NV-RAM 14, and sends them to the memory area of the RAM 13 that provides a working memory area for the CPU 11, and also uses the RAM 13 as a work area for the image forming process. With this arrangement, various functions indicated in FIGS. 2 and 3 that will be described later are implemented.

Software Configuration

Figure 2:
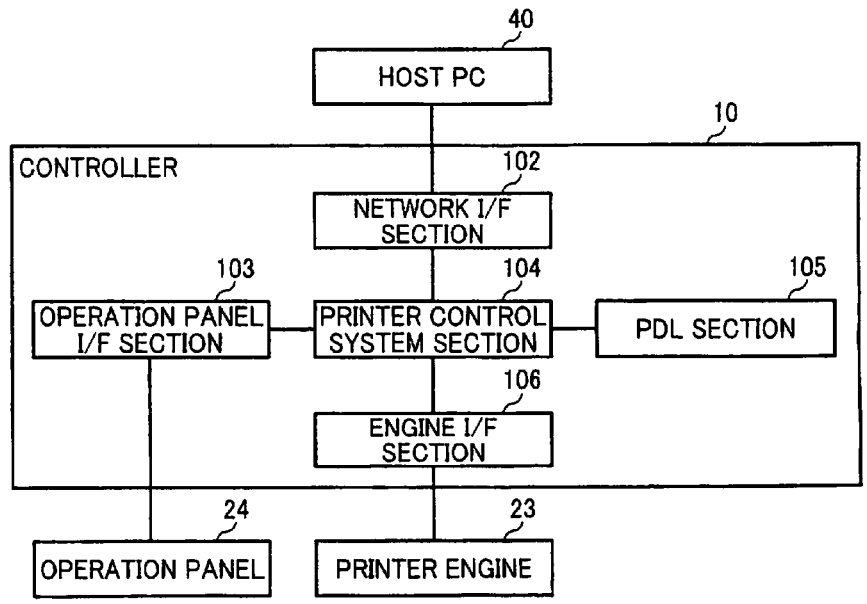
FIG. 2 is a functional block diagram illustrating the software configuration of the printer depicted in FIG. 1.

FIG. 2 is a functional block diagram illustrating the software configuration of the printer 20 depicted in FIG. 1.

The host PC 40, using a given printer driver, converts a document created or processed with an application into print data composed of a plurality of drawing commands, and sends the print data to the printer 20 to request a printout. The drawing commands are normally the commands to request respective drawings of texts, images, and graphics. The print data can be data described in various PDLs such as PostScript (registered trademark), PCL (registered trademark), and RPDL (registered trademark).

The controller 10 has a printer control system section 104 as a functional block controlling the whole controller. As modules in the controller 10, the controller 10 has, under the control of the printer control system section 104, a network I/F section 102 that exchanges data with the host PC 40 forming the image forming system, an operation panel I/F section 103 that displays images to a user and accepts an operational input of the user by exchanging data with the operation panel 24, a PDL section 105 that analyzes the print data received and generates the image data for print output and the like according to the drawing condition obtained as an analysis result, and an engine I/F section 106 that instructs the printer engine 23 to produce the print output and sends the image data used for print output and setting data for various print conditions including control conditions for fixing (described in detail later).

The printer control system section 104 further has a function to manage a processing status of the current print data processed (not depicted). This management function includes functions to grasp setting conditions for controlling the respective components that are under the control of the controller 10, monitor their operating conditions, manage the process to be executed normally, and also notify the user of the operating conditions and processing statuses as necessary. For example, when an abnormality occurs or when there is a possibility that operation not intended by the user is carried out such as changing the operation of fixing control from a normal heating power (fixing temperature) to a power saving operation based on the judgment of the controller which will be described later, the user is notified of the status through the display section of the operation panel 24 and the like.

Such a management function needs to function even when an image forming system is configured to connect an image forming apparatus with a host via a network. Such a management function is a technology provided as a basic function of a user interface in a conventional client-server system that has an image forming apparatus such as a printer and a device such as a host PC that uses the apparatus. By applying this existing technology to the function executed between the printer control system section 104 and the printer driver of the host PC 40 according to the present embodiment, such a management function can be implemented.

Internal Configuration of PDL Section

The PDL section 105 that operates under the control of the printer control system section 104 of the controller 10, generates the image data for print output based on the print data. Furthermore, the PDL section 105 determines a target value of fixing temperature as a control condition in the fixing process carried out when the printer engine 23 produces the print output using the image data generated here, more specifically, in the process of heat-fixing the toner image formed on the recording sheet.

Accordingly, the PDL section 105 has a PDL processing section of an existing printer to which a component that is required for the function to obtain the control condition is added.

FIG. 3 is a diagram illustrating the internal module configuration of the PDL section 105 depicted in FIG. 2.

As depicted in FIG. 3, the PDL section 105 includes a PDL parser section 108 that parses the print data described in PDL such as PostScript (registered trademark), PCL (registered trademark), and RPDL (registered trademark) for each PDL type sent from the host PC 40 that requests to print, and a drawing core module section 110 that generates the image data for print output and the like according to the drawing condition obtained as an analysis result of the PDL of the print data.

The PDL parser section 108 manages dither information 109. The dither information 109 includes pattern information of dither selected according to the drawing condition, information used for the process of determining the target value of fixing temperature (described in detail later), and the like. The dither information 109 is constructed with data suitable for an environment of the printer, wherein the data constructs a database, and is stored in the ROM 12 for example. The PDL parser section 108, at the time of start-up of the controller 10, obtains the dither information stored from the ROM 12 and manages the information as the dither information 109 in the PDL section 105.

The drawing core module section 110 has modules of a drawing module I/F section 111 that is an I/F for receiving respective drawing commands for texts, images, and vector graphics as the drawing conditions and drawing setting information from the PDL parser section 108; an intermediate data storage section 113 that stores as intermediate data the drawing commands for texts, images, graphics, and the like and the drawing setting information that has color, transparency settings, and the like; an intermediate data memory 115 that is the memory of save destination for the intermediate data; and a plurality of drawing process sections 117 that renders the image data for print output based on drawing data (intermediate data).

The drawing core module section 110 has a dither-to-use determining section 112. The dither-to-use determining section 112 determines a type of dither suitable for the drawing condition indicated in the PDL data, which is a target to be processed received via the drawing module I/F section 111, from multiple types of dither in the dither information 109 managed by the PDL parser section 108 as the type of dither used when producing the print output for the print request. In addition to determine the type of dither used, the dither-to-use determining section 112 further determines a target value of fixing temperature corresponding to the type of dither based on the dither information 109 managed by the PDL parser section 108, the details of which will be described later. The target value determined is retained in the dither-to-use determining section 112 for the period of producing the print output in a unit of process (a single page is defined here as a process unit).

Fixing Control Corresponding to Drawing Condition

In a laser printer, when fixing the toner image transferred on the recording sheet using the image data generated in the drawing process by dithering onto the surface of the sheet, if the shape of the toner image on the recording sheet is a small independent dot, the possibility of the dot coming off after printing is high unless it is fixed at a sufficiently high temperature. Therefore, in a conventional art, even for the toner image having a wide area which is less likely to come off even when fixed at a relatively low fixing temperature, a method that fixes at a fixed high temperature adapted for a small independent dot has been used.

However, as an issue in the conventional art, as described in the foregoing, because it results in heating at an unnecessarily high temperature for the wide area, it is not desirable in terms of saving power for energizing a heater for fixing.

Accordingly, in the present embodiment, the issue is addressed by judging from the content of the print data whether a print request is to form a toner image, which is a subject to be printed, has a wide area without having a small independent dot, so that the control of fixing at their appropriate temperatures can be performed.

In the present embodiment, the type of dither used is selected from the multiple types of dither, which are prepared and associated with the drawing conditions indicated in the print data, in accordance with the drawing condition (drawing commands and drawing setting information) indicated in the print data. By the type of dither selected, it is judged whether the fixing temperature can be reduced from a normal target value in relation to patterns that the respective types of dither have, and the target value of fixing temperature is basically determined according to this judgment.

Dither and Fixing Temperature Correspondence Table

In the present embodiment, the target value of fixing temperature is assumed to be a given value corresponding to the type of dither specified with a dither ID and thus, the information indicative of the relation between the fixing temperature and the type of dither is prepared in advance as a database in the form of a Dither and Fixing Temperature Correspondence Table as one of the dither information.

FIG. 4 is a table illustrating an exemplary Dither and Fixing Temperature Correspondence Table prepared as the database.

In the Dither and Fixing Temperature Correspondence Table in FIG. 4, the fixing temperature is indicated with temperature information of NORMAL, LV1, and LV2 corresponding to the dither ID indicative of the type of dither. The temperature information for fixing is indicated as target values of fixing temperatures in three steps; NORMAL where fixing is carried out at a standard temperature, LV1 where the fixing temperature can be lowered by one step, and LV2 where the fixing temperature can be substantially lowered below LV1. By conducting the fixing control with the target values of LV1 and LV2, power saving can be achieved.

In the table, each of color planes of KCMY (K: black, C: cyan, M: magenta, and Y: yellow) and density values (0, 1, 2, . . . , 255) are associated with the respective fixing temperatures.

As indicated in the Dither and Fixing Temperature Correspondence Table in FIG. 4, for example, while the fixing temperature information corresponding to dither ID: 1, plane: K, and density value: 0 is NORMAL, the fixing temperature information corresponding to dither ID: 0, plane: K, and density value: 0 is LV2. This primarily indicates that the fixing can be normally carried out even when the fixing control is conducted with a lowered target value of fixing temperature from NORMAL depending on the type of dither, whereby the power saving can be achieved.

In the Dither and Fixing Temperature Correspondence Table in FIG. 4, the reason why each of the color planes of KCMY and density values are also associated with the respective fixing temperatures in addition to the type of dither is that, even with the same type of dither, the target value of fixing temperature to be applied can be lowered when the color plane or the density value is different. In other words, even though it is necessary to set the target value of fixing temperature to NORMAL with some color planes and density values in a given type of dither, when it is possible to conduct the fixing control at the target value of LV1 or LV2 with other color planes and density values, the lowering of the target value of fixing temperature to the extent possible enables the power saving to be achieved.

When the dither-to-use determining section 112, which determines the type of dither used for drawing the target to be processed and determines the fixing temperature, determines the target value of fixing temperature taking into account the color plane and the density value corresponding to the type of dither, the dither-to-use determining section 112 obtains the color plane and the density value from the drawing condition acquired by the drawing module I/F section 111 and refers to the Dither and Fixing Temperature Correspondence Table in the dither information 109 managed by the PDL parser section 108 to determine the target value of fixing temperature.

Another Example of Dither and Fixing Temperature Correspondence Information

The target value of fixing temperature corresponding to each of the types of dither takes a given value. While the relation between the type of dither and the fixing temperature is represented in the Dither and Fixing Temperature Correspondence Table as indicated in FIG. 4, it may be implemented in a flag form. When implementing it in the flag form, it can be implemented by way of having a flag for each color plane of a given dither ID. When the dither pattern at the highest density value (255) is in a solid color where toner is applied to all dots, it is not necessary to distinguish the type of dither.

FIG. 5 is a table illustrating an exemplary Dither and Fixing Temperature Correspondence Information prepared for an embodiment in the flag form.

As indicated in FIG. 5, it can be implemented by two flags for each color plane, more specifically, in a form having flags for the density value of 255 (solid color) and for other than 255. Implementing this way makes it possible to retain the target values of fixing temperatures corresponding to the types of dither with less amount of memory required than that of the Dither and Fixing Temperature Correspondence Table depicted in FIG. 4.

Setting Fixing Temperatures

The drawing carried out based on the PDL data is processed on a page-by-page basis. Therefore, the setting of the fixing temperature is never changed while actually producing the print output using the image data obtained by the drawing process for one page.

Accordingly, even when the multiple types of dither to be used are selected according to the drawing conditions (drawing commands and drawing setting information) obtained as the analysis result from the print (PDL) data in each page and the respective target values of fixing temperatures corresponding to the types of dither are determined based on the dither information 109, the target value to be set is only one.

Fixing Temperature Determining Process on a Page-By-Page Basis

An embodiment of setting process of the fixing temperature conducted together with the drawing process on a page-by-page basis will be explained along the process.

It is assumed that the print data is sent from the driver of the host PC 40 to the controller 10 of the printer 20 on a job-by-job basis, and one job is formed with one or more pages. While the drawing process of one page can be a process formed with a plurality of bands, the setting process of the fixing temperature is carried out for each page. In the present embodiment, a frame memory having a capacity sufficient to store therein pixel data for one page is secured and thus, a page is defined as a unit of process.

In the print data of a job, information such as the drawing commands and the drawing setting information are inserted. Typical drawing commands include those for texts, graphics, and images. As the drawing setting information, commands for setting drawing colors, and commands for setting page resolution, bit depth, and the like are inserted.

The PDL parser section 108 that receives the print data analyzes the print data to separate it to respective commands such as the drawing commands and transmits the separated commands to the drawing module I/F section 111. The drawing module I/F section 111 transmits the commands received to the dither-to-use determining section 112.

The dither-to-use determining section 112 that receives the commands sent from the drawing module I/F section 111 selects the dither IDs used for the page based on the drawing conditions indicated by the drawing commands for texts, graphics, and images, commands for setting the drawing color, and commands for setting the page resolution, the bit depth, and the like. In determining the type of dither used, a type of dither that is suitable for the drawing condition is determined from the multiple types of dither in the dither information 109 that is structured as the database suitable for the environment of the printer and managed by the PDL parser section 108, and its dither ID is obtained.

When the drawing color is set and a drawing command I/F in the drawing module I/F section 111 is called, for the type of dither used at coordinates of drawing destination of the drawing command, its color plane and its density value are decided in addition to the dither ID determined by the dither-to-use determining section 112.

When the dither ID, the color plane, and the density value are decided, the dither-to-use determining section 112, by referring to the Dither and Fixing Temperature Correspondence Table (FIG. 4) and the like in the dither information 109 managed by the PDL parser section 108, obtains which of NORMAL, LV1, and LV2 is the target value of fixing temperature corresponding to the type of dither used.

The target value of fixing temperature for each of the drawing commands is obtained in the manner described above. This determination is made for all the drawing commands included in a page in a process unit. The target value of fixing temperature for the page in a process unit is then determined from the target values of fixing temperatures obtained for all the drawing commands according to predetermined priorities.

FIG. 6 is a table illustrating an exemplary Fixing Temperature and Priority Correspondence Table defining the priority with respect to the fixing temperature information prepared as the predetermined priorities. This table is prepared in the dither information 109.

In the example depicted in FIG. 6, the priority is defined in the descending order of temperature and thus, the target value of NORMAL in fixing temperature has the highest priority, then LV1, and LV2 that has the lowest.

By defining the priority as described above, the whole page is printed at the fixing temperature of the type of dither that requires a highest fixing temperature used for a page in a process unit, making it possible to prevent the toner from coming off due to improper fixing. When the highest fixing temperature used for a page in a process unit is LV1 or LV2, the target value can be set lower than the normal, whereby power saving of the power to energize the fixing heater can be realized.

For each of the drawing commands in a page in a process unit, in the course of conducting the process of sequentially obtaining the target values of fixing temperatures, that of a highest priority used in the page of a process unit is retained in the dither-to-use determining section 112 until the end of the process of the page and is then transmitted to the printer engine 23 via the engine I/F section 106 as the target value of fixing temperature of the page. In the process according to this procedure, when the target value of fixing temperature of the highest priority for a given drawing command (NORMAL in the example depicted in FIG. 6) is obtained in the middle of the page in a process unit, the subsequent processes of obtaining the target values of fixing temperatures can be omitted until the end of the page.

Fixing Temperature Determining Process Flow

Figure 7:
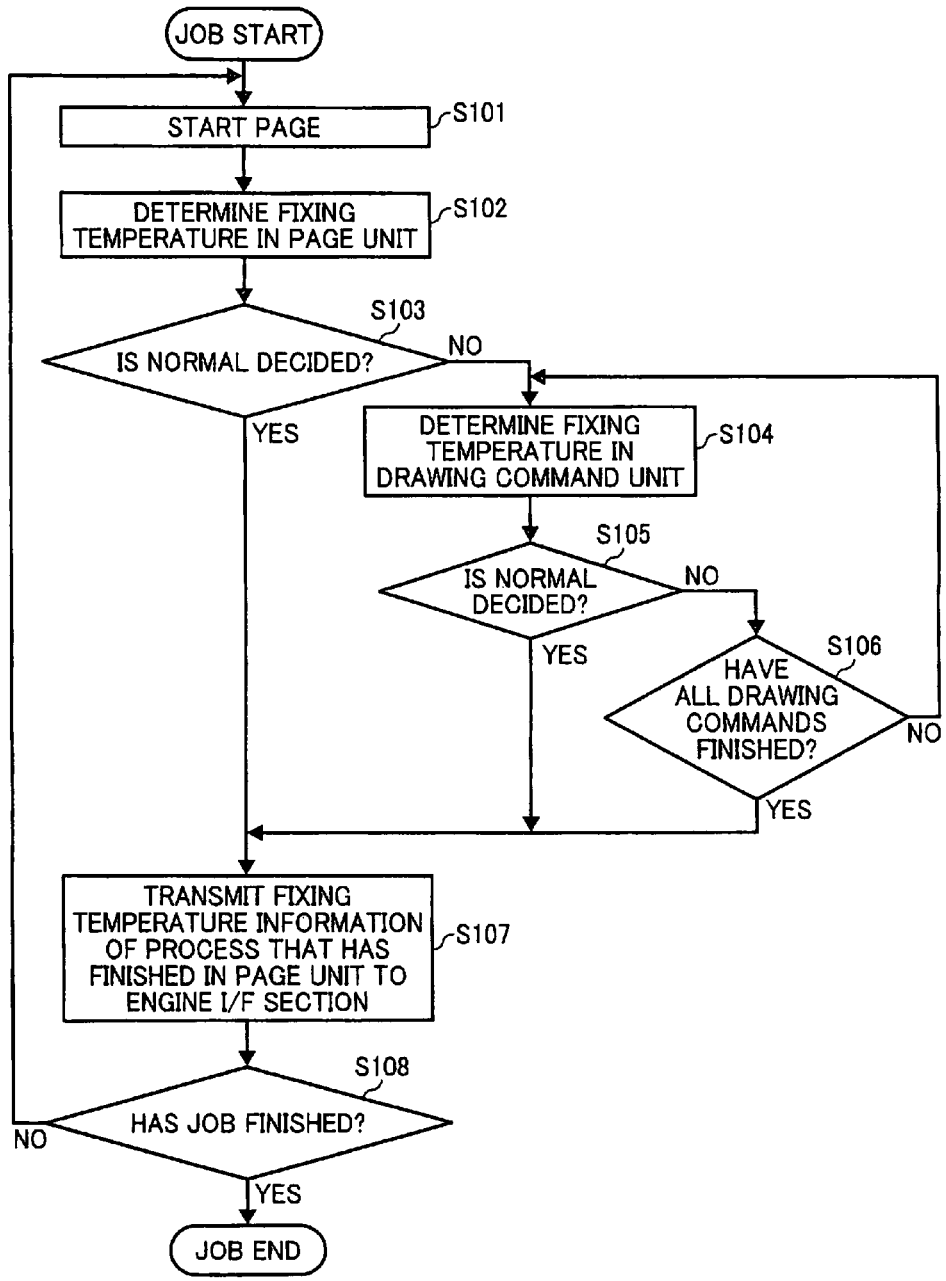
FIG. 7 is a flowchart illustrating the flow of the process of determining the fixing temperature for a job to be processed.

FIG. 7 is a flowchart illustrating the flow of the process of determining the fixing temperature for a job to be processed.

The printer control system section 104 of the controller 10 starts up the flow of the process depicted in FIG. 7 at the timing of receiving a print job by the network I/F section 102.

When the print job is formed with a plurality of pages, the printer control system section 104 determines the target values of fixing temperatures to be set on a page-by-page basis in sequence from the top page. Accordingly, the printer control system section 104 starts to process the top page (Step S101) and determines the target value of fixing temperature used for the fixing control for the page (Step S102). This is the step for the case that the setting value is determined in a page unit without conducting a later described determining process on a command-by-command basis on drawing commands.

The setting value is determined on a page-by-page basis when the setting conditions are held in the ROM 12 in advance in the form of the dither information and the like as an environment for the printer, for example, when all the dither IDs are set to use the target value of fixing temperature of NORMAL, or when a color plane of all dither IDs is set to use the target value of fixing temperature at the highest priority of NORMAL. By providing means to sense such setting conditions, the later described determining process conducted on a command-by-command basis on drawing commands can be omitted.

After the determining process conducted at Step S102, it is checked whether the target value of fixing temperature of NORMAL is decided to be used (Step S103).

If the target value of fixing temperature of NORMAL is decided to be used (Yes at Step S103), the flow moves on to Step S107.

On the other hand, if the target value of fixing temperature of NORMAL is not decided to be used at Step S103 (No at Step S103), the process of determining the target value of fixing temperature used for the fixing control on a command-by-command basis for drawing commands is carried out (Step S104). The process of determining the target value of fixing temperature carried out here is the process explained in Fixing Temperature Determining Process on a Page-By-Page Basis above.

After the determining process conducted in Step S104, it is checked whether the target value of fixing temperature of NORMAL is decided to be used (Step S105).

If the target value of fixing temperature of NORMAL is decided to be used (Yes at Step S105), the flow moves on to Step S107.

Meanwhile, if the target value of fixing temperature of NORMAL is not decided to be used at Step S105 (No at Step S105), it is checked whether the process of determining the target value of fixing temperature at Step S104 for all the drawing commands has finished (Step S106).

If there is an unprocessed drawing command at Step S106 (No at Step S106), the flow is returned to the process of determining the target value of fixing temperature at Step S104 to process the unprocessed drawing command.

If the process of determining the target value of fixing temperature at step S104 for all the drawing commands has finished (Yes at Step S106), the flow moves on to Step S107. When the determining process has finished at Step S106, a higher value of either LV1 or LV2 is held as the target value of fixing temperature and thus, this value is decided as the determining result of the target value of fixing temperature.

When the target value of fixing temperature is decided at any one of Steps S103, S105, and S106, the determining process of the fixing temperature conducted on a page-by-page basis finishes, and the determined target value of fixing temperature is transmitted as the setting value of the fixing control to the engine I/F section 106 that mediates with the printer engine 23 (Step S107).

Thereafter, it is checked whether the process for all the pages in the job to be processed has finished (Step S108). If there is an unprocessed page (No at Step S108), the flow is returned to Step S101 to process a subsequent page.

On the other hand, if it is confirmed that the processes in the job has finished with no unprocessed page left (Yes at Step S108), the flow of this process finishes.

According to the present invention, based on the types of dither known by analyzing the print data, the control to reduce the energy consumed for heat-fixing the toner image to a bare minimum is carried out, thereby allowing the power consumption to be reduced.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming apparatus comprising:
   a storage unit configured to store therein types of dither used for drawing an image, and fixing temperatures corresponding to each type of dither;
   an obtaining unit configured to obtain, from print data, a drawing condition used for drawing an image of the print data;
   a determining unit configured to determine, according to the drawing condition obtained by the obtaining unit, a type of dither used for drawing the image of the print data, from the types of dither stored in the storage unit;
   a generating unit configured to generate image data of the print data by using the dither having the type determined by the determining unit; and
   a fixing unit configured to fix an image of the image data generated by the generating unit to a recording sheet by heating a fixing portion at the fixing temperature corresponding to the type of dither determined by the determining unit, which is stored in the storing unit.

2. The image forming apparatus according to claim 1, wherein, for each of the types of dither stored in the storage unit, the fixing temperatures are associated with respective color planes and densities, and the fixing unit obtains from the storage unit the fixing temperature corresponding to the type of dither, the color plane, and the density, which are used in the drawing unit, and conducts fixing at the fixing temperature thus obtained.

3. The image forming apparatus according to claim 1, wherein the types of dither are prepared corresponding to differences in the drawing conditions including at least one of resolution and bit depth set in the print data, and the fixing temperatures corresponding to the types of dither are registered in the storage unit.

4. A computer program product comprising a non-transitory computer-usable medium having computer-readable program codes embodied in the medium for processing information in an image forming apparatus that includes a fixing control unit, the program codes when executed causing a computer to execute:

storing types of dither used for drawing an image and fixing temperatures corresponding to each type of dither in a storage unit;

obtaining, from print data, a drawing condition used for drawing an image of the print data;

determining, according to the drawing condition obtained by the obtaining unit, a type of dither used for drawing the image of the print data, from the types of dither stored in the storage unit;

generating image data of the print data by using the dither having the type determined by the determining unit; and fixing an image of the generated image data to a recording sheet by heating a fixing portion at the fixing temperature corresponding to the determined type of dither stored in the storing unit.

5. An image forming system comprising:

the image forming apparatus according to claim 1; and a host that connected with the image forming apparatus via a communication unit, and sends a print job to the image forming apparatus and receives a notice of processing status of the print job by the communication unit, wherein the host includes a user interface having a display section and an operation section, and a printer driver that functions as a processing unit for displaying the notice of processing status of the print job on the user interface and as a generating unit for generating print data in a page description language in response to an instruction operation from the user interface.

6. The image forming system according to claim 5, wherein the notice of processing status of the print job is a control condition of the fixing control unit.

7. A method of fixing control comprising:

storing types of dither used for drawing an image and fixing temperatures corresponding to each type of dither in a storage unit;

obtaining, from print data, a drawing condition used for drawing an image of the print data;

determining, according to the drawing condition obtained by the obtaining unit, a type of dither used for drawing the image of the print data, from the types of dither stored in the storage unit;

generating image data of the print data by using the dither having the type determined by the determining unit;

fixing an image of the generated image data to a recording sheet by heating a fixing portion at the fixing temperature corresponding to the determined type of dither stored in the storing unit.

8. The method of fixing control according to claim 7, wherein, for each of the types of dither stored in the storage unit, the fixing temperatures are associated with respective color planes and densities, and the fixing temperature corresponding to the type of dither, the color plane, and the density, which are used in the generating of the output image data in the drawing process, is obtained from the storage unit, and fixing at the target value thus obtained is conducted.

9. The method of fixing control according to claim 7, wherein the types of dither are prepared corresponding to differences in the drawing conditions including at least one of resolution and bit depth set in the print data, and the fixing temperatures corresponding to the types of dither are registered in the storage unit.

* * * * *